(12) United States Patent
Kim

(10) Patent No.: US 7,778,670 B2
(45) Date of Patent: Aug. 17, 2010

(54) MOBILE TELECOMMUNICATION HANDSET AND METHOD FOR RECOGNIZING ONE OR MORE CARDS USING ONE SOCKET

(75) Inventor: Yoon-Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 983 days.

(21) Appl. No.: 11/539,128

(22) Filed: Oct. 5, 2006

(65) Prior Publication Data

US 2008/0085737 A1    Apr. 10, 2008

(30) Foreign Application Priority Data

Oct. 5, 2005    (KR)    ........................ 10-2005-0093589

(51) Int. Cl.
H04B 1/38    (2006.01)
(52) U.S. Cl. .................... 455/558; 455/551; 455/556.1; 455/575.1; 455/414.1; 710/301
(58) Field of Classification Search ................. 455/558, 455/551, 556.1, 566, 575.1, 414.1; 710/301
See application file for complete search history.

(56) References Cited

U.S. PATENT DOCUMENTS 6,223,052 B1 * 4/2001 Ali Vehmas et al. ......... 455/551
6,279,824 B1 * 8/2001 Park .......................... 235/379
6,763,249 B2 * 7/2004 Shirai ......................... 455/558
2004/0107447 A1 * 6/2004 Katagishi et al. ............ 725/135
2006/0019705 A1 * 1/2006 Fukuda ..................... 455/556.1
2006/0229114 A2 * 10/2006 Kim ......................... 455/575.1

FOREIGN PATENT DOCUMENTS

| CN | 1476238 | 2/2004 |
|---|---|---|
| DE | 10054379 | 5/2002 |
| KR | 10-2004-0017524 A | 8/2002 |

* cited by examiner

Primary Examiner—Matthew D Anderson
Assistant Examiner—Shaima Q Aminzay
(74) Attorney, Agent, or Firm—Lee, Hong, Degerman, Kang & Waimey

(57) ABSTRACT

The present invention is related to a mobile telecommunication handset for recognizing at least one card capable of facilitating a telecommunication service with a network. The mobile telecommunication handset includes a socket for inserting the at least one card, wherein one card can be inserted into the socket at a time, a memory for storing information related to the at least one card inserted into the socket, and a controlling unit operationally coupled with the socket and the memory for operating the mobile telecommunication handset, wherein the controlling unit is capable of utilizing information related to any one of a preceding card and a subsequent card after the preceding card is inserted into and removed from the socket and the subsequent card is inserted into the socket to facilitate an event associated with the any one of the preceding and subsequent cards.

15 Claims, 4 Drawing Sheets

MOBILE TELECOMMUNICATION HANDSET AND METHOD FOR RECOGNIZING ONE OR MORE CARDS USING ONE SOCKET

CROSS-REFERENCE TO RELATED APPLICATIONS

Pursuant to 35 U.S.C. §119(a), this application claims the benefit of earlier filing date and right of priority to Korean Application No. 10-2005-0093589, filed on Oct. 5, 2005, the contents of which are hereby incorporated by reference herein in their entirety.

FIELD OF THE INVENTION

The present invention is related to a mobile telecommunication handset for recognizing at least one card capable of facilitating a telecommunication service with a network.

BACKGROUND OF THE INVENTION

A telecommunication service is available, wherein one or more telephone numbers can be assigned to one mobile telecommunication handset (hereinafter "mobile handset"). Moreover, a mobile handset may utilize a card for storing user information, network information, and other data necessary for the mobile handset to function with a network. Typically, such a card is inserted into a socket of the mobile handset. Thus, if a mobile handset using a card is assigned one or more telephone numbers, the mobile handset will require as many sockets as the number of telephones numbers assigned.

For example, if a user receives services from two different service providers, then two sockets will have to be integrated into the user's mobile handset, wherein each socket accepts a card corresponding to each different service. However, such a mobile handset is problematic because a size of the mobile handset becomes larger as the number of sockets integrated into the mobile handset becomes larger. Accordingly, a user utilizing a mobile handset capable of receiving services from a plurality of service providers is inconvenienced by having to carry a large-size mobile handset due to the plurality of sockets integrated into the mobile handset.

SUMMARY OF THE INVENTION

The present invention is directed to a mobile telecommunication handset for recognizing at least one card capable of facilitating a telecommunication service with a network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile telecommunication handset for recognizing at least one card capable of facilitating a telecommunication service with a network, the mobile telecommunication handset comprising a socket for inserting the at least one card, wherein one card can be inserted into the socket at a time, a memory for storing information related to the at least one card inserted into the socket, and a controlling unit operationally coupled with the socket and the memory for operating the mobile telecommunication handset, wherein the controlling unit is capable of utilizing information related to any one of a preceding card and a subsequent card after the preceding card is inserted into and removed from the socket and the subsequent card is inserted into the socket to facilitate an event associated with the any one of the preceding and subsequent cards.

Preferably, the preceding and subsequent cards are alternatively inserted into the socket while the mobile telecommunication handset is powered on. Preferably, the memory retains the information related to the at least one card inserted into the socket when the mobile telecommunication handset is powered off.

Preferably, the information related to the at least one card inserted into the socket comprises at least one of international mobile subscriber identity (IMSI) information, network information, country information, and phonebook information. Preferably, the at least one card comprises at least one of a subscriber identity module (SIM) card and a user identity module (UIM) card.

In one aspect of the invention, if update information related to a card removed from the socket is received during an event, the controlling unit updates information stored in the memory related to the card removed from the socket when the card is later inserted into the socket. Preferably, the update information comprises at least one of phonebook information, a call log, a call charge and a short message content.

Preferably, the controlling unit provides a menu on which to select information related to one of the preceding and subsequent cards.

In another aspect of the invention, the controlling unit temporarily stores information related to the subsequent card in the memory. Preferably, the temporarily-stored information is deleted after a specific amount of time elapses or when the subsequent card is removed from the socket. Preferably, the specific amount of time is variable.

In a further aspect of the invention, the controlling unit does not store information related to the subsequent card in the memory.

In accordance with another embodiment of the present invention, a method for recognizing at least one card capable of facilitating a telecommunication service between a mobile telecommunication handset and a network comprises inserting the at least one card into a socket of the mobile telecommunication handset, wherein one card can be inserted into the socket at a time, storing in a memory information related to the at least one card inserted into the socket, and controlling operation of the mobile telecommunication handset by utilizing information related to any one of a preceding card and a subsequent card after the preceding card is inserted into and removed from the socket and the subsequent card is inserted into the socket to facilitate an event associated with the any one of the preceding and subsequent cards.

Preferably, the information related to the at least one card inserted into the socket comprises at least one of international mobile subscriber identity (IMSI) information, network information, country information, and phonebook information. Preferably, the at least one card comprises at least one of a subscriber identity module (SIM) card and a user identity module (UIM) card.

In one aspect of the invention, the method further comprises updating information stored in the memory related to a card removed from the socket when the card is later inserted into the socket if update information related to the card removed from the socket is received during an event. Preferably, the update information comprises at least one of phonebook information, a call log, a call charge and a short message content.

Preferably, the method further comprises providing a menu on which to select information related to one of the preceding and subsequent cards.

In another aspect of the invention, the method further comprises temporarily storing information related to the subsequent card in the memory. Preferably, the temporarily-stored information is deleted after a specific amount of time elapses or when the subsequent card is removed from the socket. Preferably, the specific amount of time is variable.

In accordance with another embodiment of the present invention, a method for recognizing at least one card capable of facilitating a telecommunication service between a mobile telecommunication handset and a network comprises storing in a memory information related to preceding card inserted into a socket of the mobile telecommunication handset, wherein one card can be inserted into the socket at a time, removing the preceding card from the socket and inserting a subsequent card into the socket, recognizing information related to the subsequent card inserted into the socket, temporarily storing in the memory the recognized information related to the subsequent card, showing a menu on which to select information related to one of the preceding and subsequent cards, enabling an event to be executed using selected information, and deleting the temporarily-stored information related to the subsequent card when the event has ended or when a specific time has elapsed if the event is executed using the information related to the subsequent card.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention provides a mobile telecommunication handset for recognizing one or more cards capable of facilitating a telecommunication service using one socket.

Figure 1:
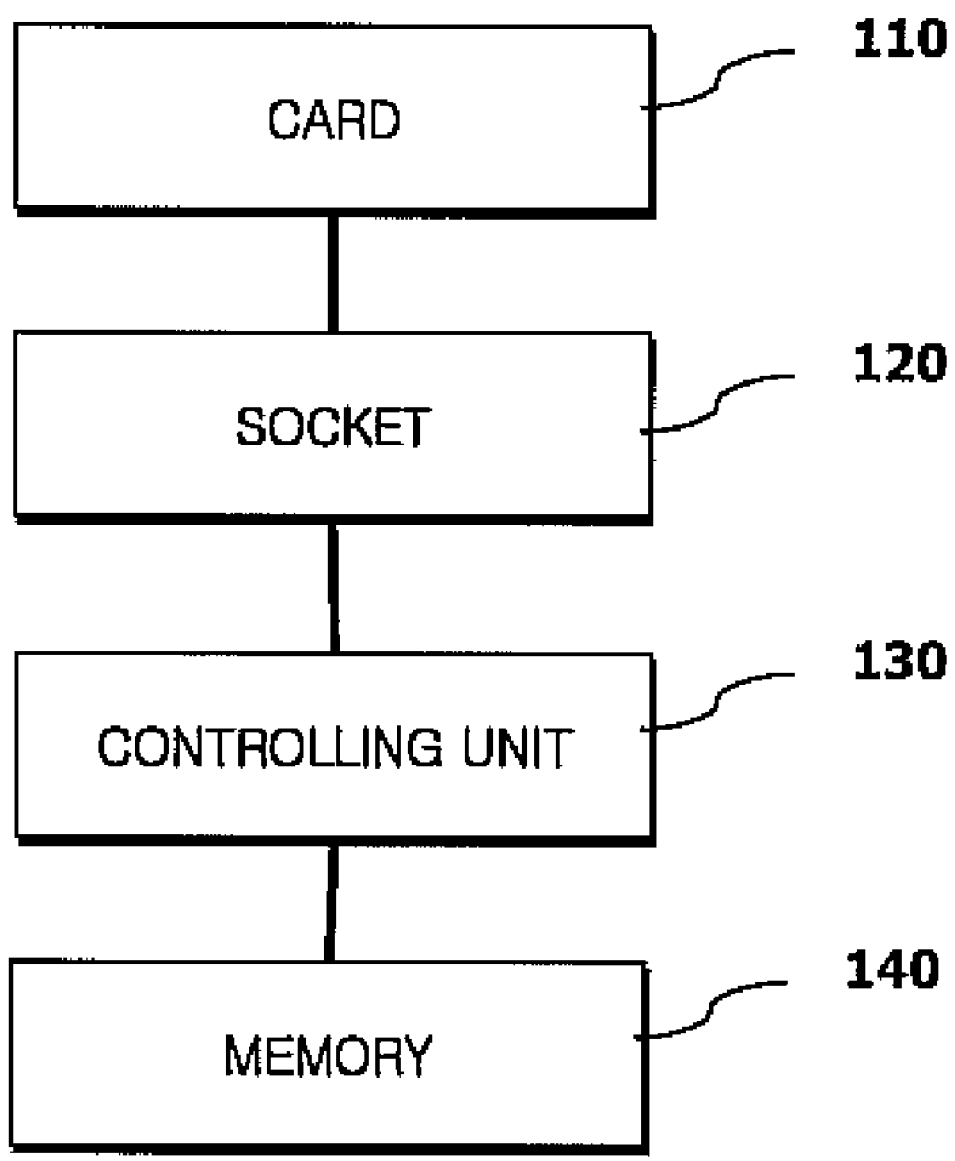
FIG. 1 illustrates a card-socket apparatus in accordance with one embodiment of the present invention.

FIG. 1 illustrates a card-socket apparatus in accordance with one embodiment of the present invention. Referring to FIG. 1, a card 110 for facilitating a telecommunication service with a network is operationally coupled with a socket 120 of a mobile handset. Preferably, the card 110 stores data, such as a user's personal information and mobile handset settings. The card 110 may also store network information and other data necessary for the mobile handset to function. Essentially, the card 110 acts as the user's access key to a telecommunication network. The socket 120 is provided on an outside surface (e.g., a lateral side, an upper side, or a lower side) of the mobile handset and is designed to accept the card 110, wherein the socket 120 acts as an interface between the card 110 and the mobile handset. Preferably, the card 110 inserted into the socket 120 may be a subscriber identity module (SIM) card, a user identity module (UIM) card, and an integrated circuit (IC) card, for example. Preferably, the card 110 inserted into the socket 120 is hot-swap enabled. That is, the card can be inserted into or removed from the socket with the mobile telecommunication handset powered on. In accordance with the present invention, the socket 120 can recognize one or more cards. Therefore, the socket 120 is capable of initially recognizing a first card inserted therein, and later recognizing a second card inserted therein after removing the first card.

A controlling unit 130 is operationally coupled with the socket 120. Before or after exchanging a recognized first card with an unrecognized second card, the controlling unit stores information about the first card in a RAM memory or a flash memory. The controlling unit 130 enables a menu function of the mobile handset, wherein the menu function allows the user to select from the stored information related to the first card and information related to the second card.

In accordance with the present invention, when a specific key (e.g. a lateral key, a 4-way navigation key or a keypad key) of the mobile handset is pressed, the controlling unit 130 can avoid storing information related to the first or second cards prior to the first or second cards being inserted in the socket 120, respectively. Thus, pressing the specific key prevents information read from the first or second cards from being stored in the memory. Alternatively, pressing the specific key can automatically delete the read information after a specific amount of time elapses. This is useful when the mobile telecommunication handset is lent to another person, or when the card is intended to be used one time. Preferably, a module which enables or disables a function for storing the information read from the first or second card in the memory, is provided to the controlling unit 130. Also, the specific amount of time required prior to automatically deleting the read information may be set according to a user's need.

When the update information is received, the controlling unit 130 determines whether the update information is associated with the first card or the second card. When the update information is determined to be associated with the first card, the controlling unit 130 stores the update information in the first card alone, or stores the update information in the first card and the memory simultaneously. When the update information is determined to be associated with the second card, the controlling unit 130 stores the update information in a flash memory. Preferably, the update information stored in the flash memory is transferred to the second card when the second card is later inserted into the socket 120. After being stored in the second card, the update information may then be stored in the memory in which information about the cards is stored, or in another memory.

Referring to FIG. 1, the memory 140 includes the RAM memory or the flash memory. Information, including update information, related to the cards may be temporarily or permanently stored in the memory 140. Preferably, information related to the card may include at least one of network information, country information, an international mobile subscriber identity (IMSI) value, and phonebook information, for example. Update information may include at least one of phonebook information, a call log, a call charge and a short message content, for example.

The update information may be associated with one or more cards. The update information, when associated with the inserted card in use, may be stored in the inserted card in use alone. Alternatively, the update information may be stored in the inserted card in use and the memory simultaneously.

In accordance with the present invention, the one or more cards recognized by the socket 120 may be provided by one service provider or by different service providers. Furthermore, the one or more cards may be alternately inserted into the socket 120.

Figure 2:
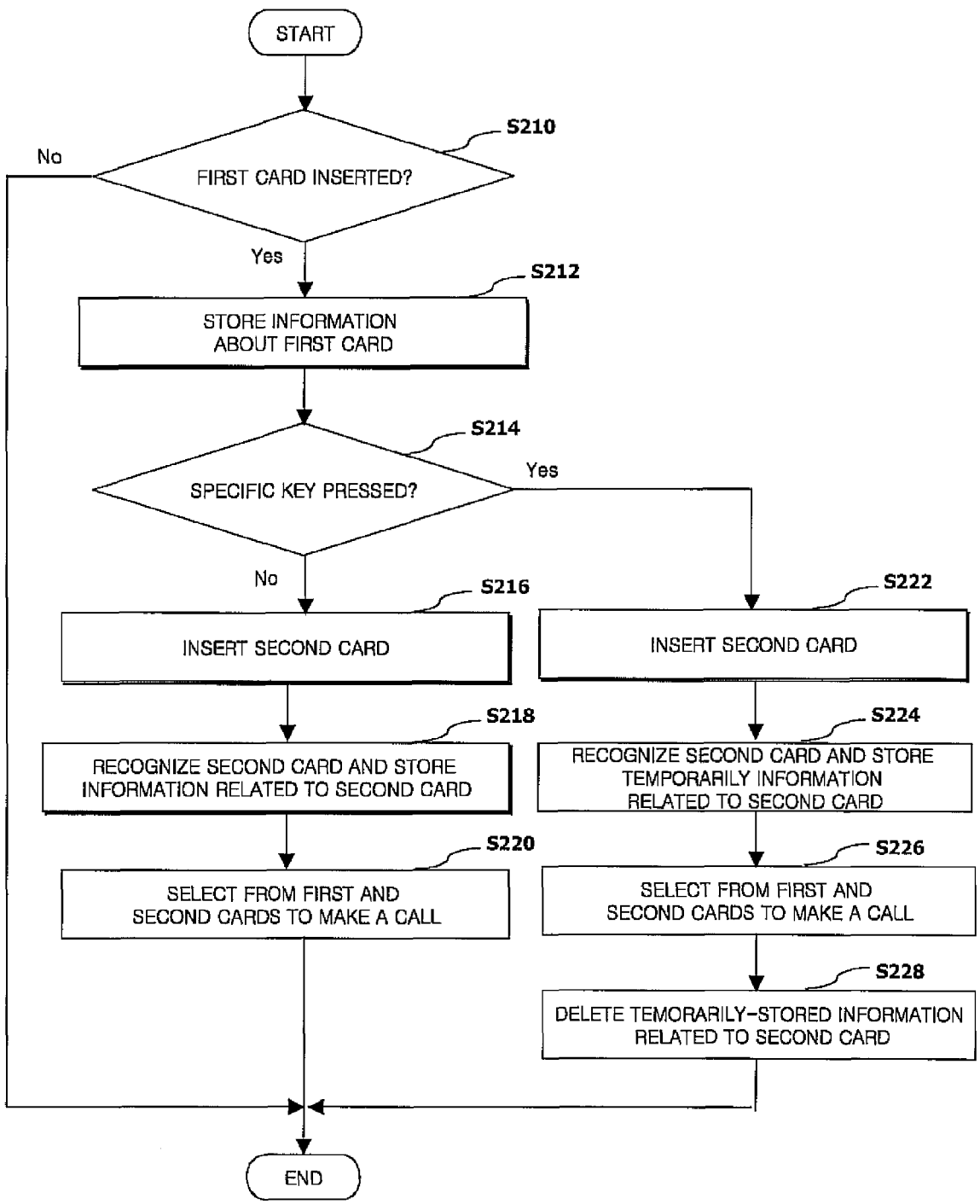
FIG. 2 illustrates a method for recognizing one or more cards in a mobile telecommunication handset in accordance with one embodiment of the present invention.

FIG. 2 illustrates a method for recognizing one or more cards in a mobile telecommunication handset in accordance with one embodiment of the present invention. As shown in FIG. 2, when a first card is inserted into a socket to make a call, information related to the inserted first card is stored (S210 and S212) in the mobile handset. When the first card is removed from the socket and a second card is inserted into the socket without pressing a specific key, a controlling unit recognizes the inserted second card and stores information related to the inserted second card (S214, S216, and S218). A call can then be made using the stored information related to a selected first or second card (S220).

Alternatively, when the second card is inserted into the socket after pressing a specific key (S214), i.e., when it is unnecessary to permanently store the information related to the second card, such as when the mobile handset is lent to another person, the controlling unit recognizes the second card and temporarily stores information related to the inserted second card (if necessary to make a call) or reads the information from the second card (S222, S224). When one of the first and second cards is selected for use, the controlling unit enables a call using the information related to the selected card. When ending the call, the controlling unit deletes the temporarily-stored information related to the second card (S226, S228).

In accordance with the present invention, when the second card is inserted into the socket, a menu may be displayed on the mobile handset. From the menu, the card may be recognized. Otherwise, the card may automatically be recognized without showing the menu. Preferably, when the card is automatically recognized, information including update information, related to the recognized card is stored in real time before inserting another card because the information including update information related to the recognized card cannot be stored after insertion of another card.

The information related to each of the cards, which are inserted into the socket, can be stored. The information related to the card, which is inserted into the socket, and therefore in use can be stored. Additionally, another card can be inserted into the socket without storing information related to the existing card before removing the existing card from the socket.

Figure 3:
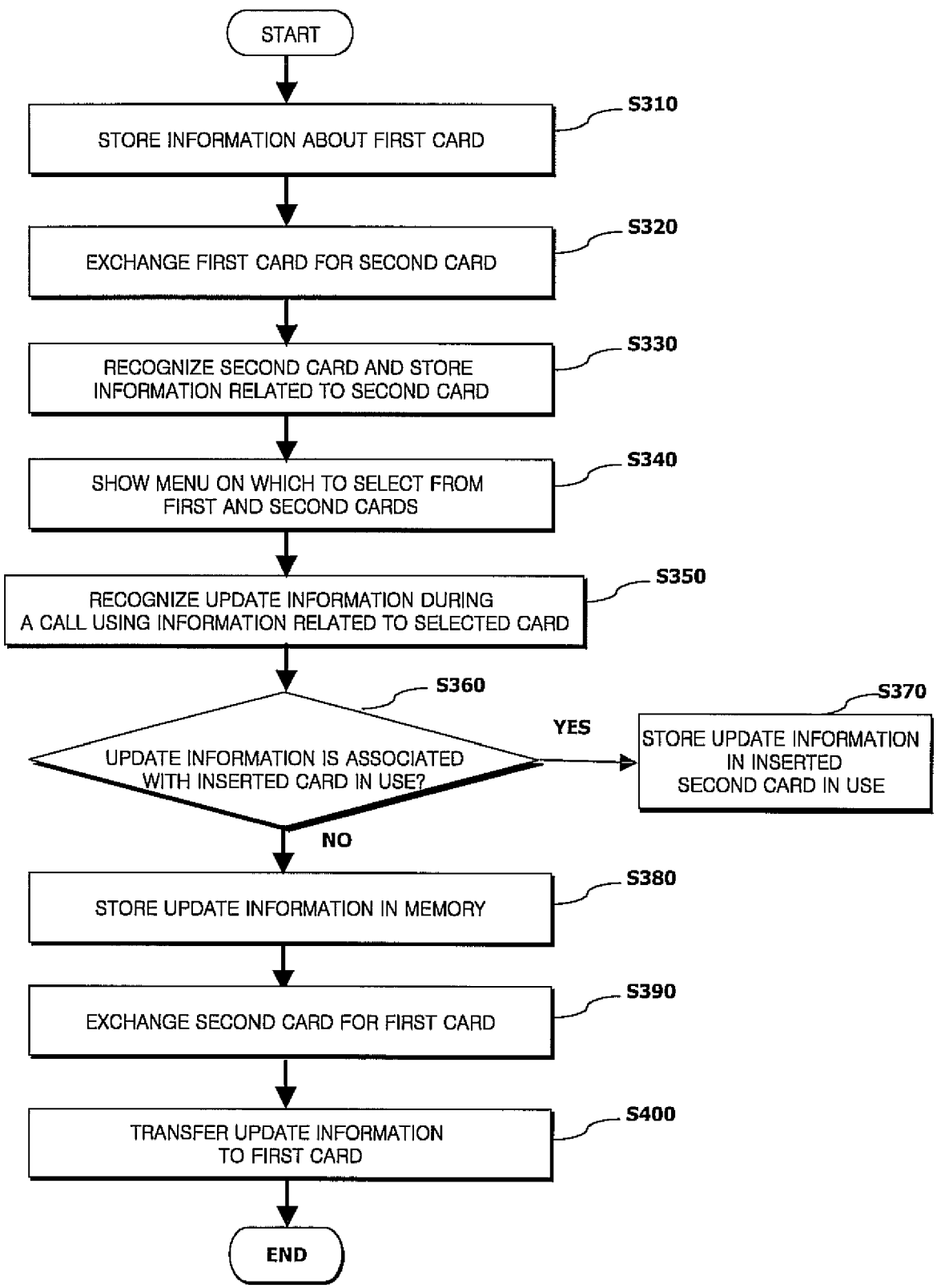
FIG. 3 is a flow chart illustrating steps for storing update information in the mobile telecommunication handset for recognizing one or more cards in accordance with one embodiment of the present invention.

FIG. 3 is a flow chart illustrating steps for storing update information in the mobile communication handset for recognizing one or more cards in accordance with one embodiment of the present invention. As shown in FIG. 3, the controlling unit 130 stores information related to a first card inserted into a socket 120 (S310). When the first card is removed from the socket 120 and a second card is inserted therein (S320), information related to the second card is recognized and stored (S330). Furthermore, the controlling unit 130 enables a menu to be shown (S340) on the mobile handset, wherein the stored information related to the first card or the inserted second card can be selected from the menu. During a call, update information received can be recognized using information related to a selected card (S350). In FIG. 3, the selected card is the second card, for example. If it is determined that update information is associated with the inserted second card in use (S360), the update information is preferably stored in the inserted second card (S370). Alternatively, if the update information is determined not to be associated with the inserted second card in use, the update information is stored in a memory (S380). Accordingly, if the stored update information is determined to be associated with the first card, the stored update information is transferred to the first card (S400) when the first card is inserted into the socket 120 (S390).

In accordance with the present invention, if the update information is determined to be associated with the inserted second card in use, the update information may be stored in the inserted second card in use, or stored in real time in the memory along with the already stored information related to the second card. The update information may be stored in the same memory as other information related to the one or more cards. Moreover, the update information may be stored in a memory different from the memory in which other information related to each of the cards is stored. Preferably, if the update information is stored in the different memory, the update information is transferred to the card associated with the update information when the card is inserted into the socket 120.

Figure 4:
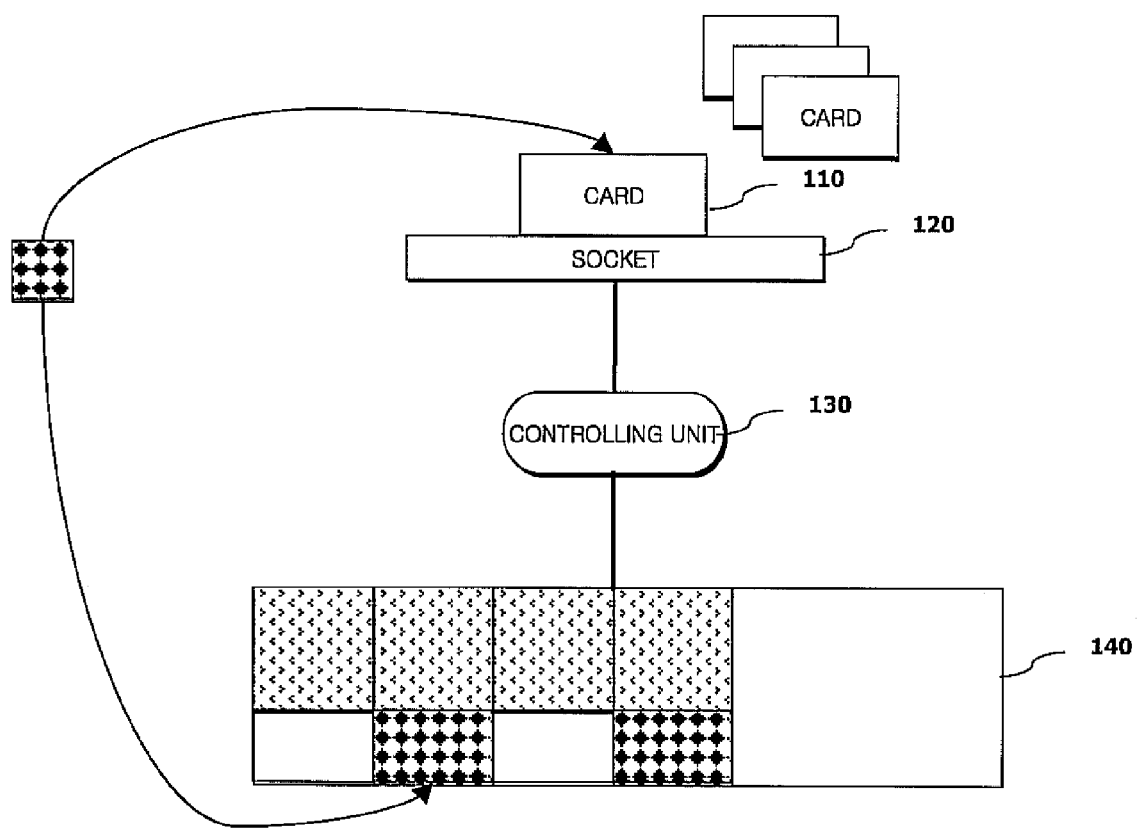
FIG. 4 illustrates storing information in the mobile telecommunication handset for recognizing one or more cards in accordance with one embodiment of the present invention.

Referring to FIGS. 3 and 4, one embodiment of the present invention will be described. For the sake of explanation, a first SIM card for business purposes and a second SIM card for personal use are utilized.

When a first SIM card is inserted into a socket 120, a message "CARD RECOGNITION FINISHED" is displayed on a display after the first SIM card is recognized. The controlling unit 130 then enables a message "INSERT ANOTHER CARD?" to be displayed on the display, prompting a user to determine if the existing card is to be removed from the socket 120 in order to insert another card therein.

If the user answers "NO" to the message, the mobile telecommunication handset operates according to the first SIM card. If the user answers "YES" to the message, such as when the user wishes to make a personal call, for example, the controlling unit 130 preferably stores information related to the first SIM card in a RAM memory and a flash memory (S310). Specifically, the information is temporarily stored in the RAM memory and stored in the flash memory for back up.

When storing the information related to the first SIM card is completed, the controlling unit 130 enables a message "STORING FINISHED" to be displayed on the display. The user then removes the first card from the socket 120 and inserts the second card therein (S320).

Thereafter, the control unit 130 recognizes the second SIM card and enables a call to be made using information related to the second card. The information related to the second card is stored in the memory. As a result, the user can use two different telephone numbers in the same mobile telecommunication handset by changing the information related to the first card for business purposes to the information related to the second card for personal purpose use using a "CARD SELECTION" button, for example (S340).

When update information (e.g., phonebook information, a call log, a call charge and a short message content) is received, it is in real time stored directly in the inserted card in use or in the memory. Preferably, if the received update information is associated with a card removed from the socket, it is stored in the flash memory. Notably, if the received update information associated with the card removed from the socket is not stored in the flash memory, making a call using the removed card may be inconvenienced.

If the update information is received while the user is making a call using the second SIM card, with the first SIM card removed from the socket, the controlling unit 130 recognizes the update information (S350) and enables a message "UPDATE INFORMATION" to be displayed on the display. The controlling unit 130 then determines whether the update information is associated with the inserted card in use (S360).

If the update information is determined to be associated with the first SIM card, the controlling unit 130 stores the update information in the flash memory or the RAM memory in the background (S380). When the first SIM card is later inserted into the socket 120, the update information (e.g., phonebook information, a call log, a call charge and a short message content) is transferred to the first SIM card (S400) after the first SIM card is re-inserted (S390).

If the update information is determined to be associated with the second SIM card, the update information may be stored directly in the second SIM card alone or simultaneously stored in the second SIM card and the memory (S370). Once the update information is stored, the controlling unit 130 enables a "STORING FINISHED" message to be displayed on the display.

As described above, recognition of one or more cards using one socket is made possible by storing information related to a card in a RAM memory and at the same time in a flash memory of a mobile handset. Thereafter, a user may selectively use the information related to the cards. Preferably, if update information is received which is not associated with a card currently inserted into the socket, the update information is first stored in the flash memory and later transferred to the card corresponding to the update information when the card is inserted into the socket. Accordingly, card information is efficiently updated without a need for additional time.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile telecommunication handset for recognizing at least one card capable of facilitating a telecommunication service with a network, the mobile telecommunication handset comprising:
   a socket for inserting first and second cards, wherein the second card is inserted into the socket after the first card is inserted and removed from the socket;
   a memory for storing information related to the first and second cards; and
   a controlling unit configured to selectively perform a call using one of the stored information of the first card and information of the inserted second card according to a menu selection,
   wherein the controlling unit is further configured to display a menu for selecting information related to one of the first and second cards if the information of the second card is stored in the memory,
   wherein the information related to the second card is temporarily stored in the memory if a specific key is pressed prior to the second card being inserted into the socket, and is deleted after a specific amount of time elapses or when the second card is removed from the socket.

2. The mobile telecommunication handset of claim 1, wherein the memory retains the information related to the first and second cards inserted into the socket when the mobile telecommunication handset is powered off.

3. The mobile telecommunication handset of claim 1, wherein the information related to the first and second cards inserted into the socket comprises at least one of:
   international mobile subscriber identity (IMSI) information;
   network information;
   country information; and
   phonebook information.

4. The mobile telecommunication handset of claim 1, wherein the first and second cards comprise at least one of a subscriber identity module (SIM) card and a user identity module (UIM) card.

5. The mobile telecommunication handset of claim 1, wherein if update information related to the first card removed from the socket is received during a call, the controlling unit updates information stored in the memory related to the first card when the first card is later inserted into the socket.

6. The mobile telecommunication handset of claim 5, wherein the update information comprises at least one of phonebook information, a call log, a call charge and a short message content.

7. The mobile telecommunication handset of claim 1, wherein the controlling unit temporarily stores information related to the second card in the memory after the specific key is pressed on the mobile telecommunication handset prior to the second card being inserted in the socket.

8. The mobile telecommunication handset of claim 1, wherein the controlling unit does not store information related to the second card in the memory after the specific key is pressed on the mobile telecommunication handset prior to the second card being inserted in the socket.

9. A method for recognizing at least one card capable of facilitating a telecommunication service between a mobile telecommunication handset and a network, the method comprising:
   inserting first and second cards into a socket, wherein the second card is inserted into the socket after the first card is inserted and removed from the socket;
   storing in a memory information related to the first and second cards;
   displaying a menu for selecting information related to one of the first and second cards if the information related to the second card is stored in the memory; and
   selectively performing a call using one of the stored information of the first card and information of the inserted second card according to a user's selection on the menu,
   wherein the information related to the second card is temporarily stored in the memory if a specific key is pressed prior to the second card being inserted into the socket, and is deleted after a specific amount of time elapses or when the second card is removed from the socket.

10. The method of claim 9, wherein the information related to the first and second cards inserted into the socket comprises at least one of:
   international mobile subscriber identity (IMSI) information;
   network information;
   country information; and
   phonebook information.

11. The method of claim 9, wherein the first and second cards comprise at least one of a subscriber identity module (SIM) card and a user identity module (UIM) card.

12. The method of claim 9, further comprising updating information stored in the memory related to the first card when the first card is later inserted into the socket if update information related to the first card is received during a call.

13. The method of claim 12, wherein the update information comprises at least one of phonebook information, a call log, a call charge and a short message content.

14. A method for recognizing at least one card capable of facilitating a telecommunication service between a mobile telecommunication handset and a network, the method comprising:
   inserting a first card into a socket of the mobile telecommunication handset;
   recognizing the first card;
   prompting a user to determine if the first card is to be removed from the socket if the first card is recognized;
   storing in a memory information related to the first card when it is determined to be removed from the socket;
   inserting a second card into the socket after removing the first card from the socket;
   recognizing the second card; and
   selectively performing a call using one of the stored information of the first card and the recognized information of the inserted second card according to a user's selection.

15. The method of claim 14, further comprising:
   recognizing update information during a call;
   determining if the update information is associated with the inserted second card;
   directly storing the update information in the second card when the update information is determined to be associated with the second card; and
   updating information stored in the memory related to the first card when the first card is later inserted into the socket if the update information is determined to be associated with the first card.

* * * * *